UNITED STATES PATENT OFFICE.

HEINRICH JORDAN, OF LEVERKUSEN, NEAR COLOGNE, GERMANY, ASSIGNOR, BY MESNE ASSIGNMENTS, TO THE GRASSELLI CHEMICAL COMPANY, OF CLEVELAND, OHIO, A CORPORATION OF OHIO.

COTTON DYES.

1,422,866.  Specification of Letters Patent.  Patented July 18, 1922.

No Drawing.  Application filed September 27, 1919. Serial No. 326,984.

*To all who mit may concern:*

Be it known that I, HEINRICH JORDAN, citizen of the German Empire, residing at Leverkusen, near Cologne, Germany, have invented new and useful Improvements in Cotton Dyes, of which the following is a specification.

The present invention relates to the manufacture and production of new and valuable azodyestuffs capable of dyeing cotton pure greenish-blue shades fast to light which dyeings are rendered fast to washing by an after-treatment with formic aldehyde.

The new products are after being dried and pulverized in the shape of their salts with alkali metals dark powders which are soluble in water with a bluish coloration and soluble in concentrated sulfuric acid generally with a greenish coloration. Upon reduction with stannous chlorid and hydrochloric acid they are broken up into a 1.4-naphthylenediamin sulfonic acid, an aminooxynaphthalene and 1.3-dioxy-4-aminobenzene.

The process for producing the new dyes consists in combining diazocompounds of 1-monoacidylamino-4-aminonaphthalene-6 or 7-sulfonic acid with 1-aminonaphthalene-6 or 7-sulfonic acid or a mixture of these acids, diazotizing the resulting intermediate compounds coupling the diazocompounds with beta-naphthol or 2.7-dioxynaphthalene, splitting off the acidyl group by saponification, diazotizing and coupling with resorcin.

In order to illustrate the new process more fully the following example is given, the parts by weight:—

28 parts of 1-acetylamino-4-aminonaphthalene-6-sulfonic acid are dissolved in 750 parts of water with the addition of 5.5 parts of sodium carbonate. The resulting solution is acidulated with 28 parts of hydrochloric acid (19° Bé.) and is diazotized with 6.9 parts of sodium nitrite. The diazocompound is then added at 10–15° C. to a solution of 22.3 parts of 1-aminonaphthalene-6-sulfonic acid in 1000 parts of water and 5.5 parts of carbonate of sodium to which solution 16 parts of sodium acetate (100 per cent) had previously been added and which had been slightly acidulated with hydrochloric acid. The copulation is complete after a short time. The mixture is acidulated by the addition of 56 parts of hydrochloric acid (19° Bé.) and diazotized with 6.9 parts of sodium nitrite. The diazosolution is then coupled at 5–10° C. with a solution of 14.4 parts of beta-naphthol in 600 parts of water and 14 part of caustic soda lye (36° Bé.) to which solution 50 parts of sodium carbonate has been added. The dye is filtered off, stirred up with 1500 parts of water. It is heated to boiling, 140 parts of caustic soda lye 36° Bé.) are added, the mixture is heated to boiling during a quarter of an hour, cooled with ice to 70° C. neutralized with hydrochloric acid and filtered off. The paste is stirred up with 1000 parts of water, acidulated with 35 parts of hydrochloric acid (19° Bé.) and diazotized at 0–5° C. with 6.9 parts of sodium nitrite. The diazocompound is then combined at 0° with a well cooled solution of 11 parts of resorcin in 400 parts of water containing 40 parts of sodium carbonate. The dye is salted out and filtered off.

It is after being dried and pulverized in the shape of its sodium salt a dark powder soluble in water with a greenish-blue coloration, soluble in concentrated sulfuric acid with a greyish-green coloration. It has in a free state most probably the following formula:

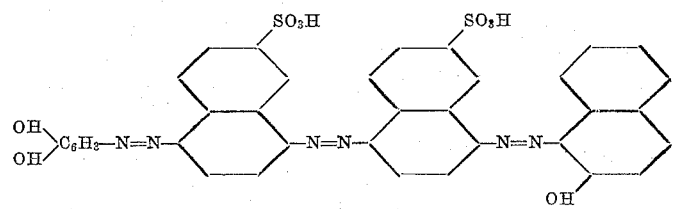

Upon treatment with stannous chlorid and hydrochloric acid it is broken up into 1.4-diaminonaphthalene sulfonic acid, 1-amino-2-naphthol and 1.3-dioxy-4-aminobenzene. It dies cotton pure greenish-blue shades.

1.4-diaminonaphthalene-7-sulfonic acid can be substituted for the 1.4-diaminonaphthalene-6-sulfonic acid, the 1.7-sulfonic acid for the 1.6 acid etc. Instead of beta-naphthol the 2.7-dioxynaphthalene can be used.

I claim:

1. The new trisazodyes being derived from 1.4-diaminonaphthalene sulfonic acid, naphthylamin sulfonic acid a naphthol compound and resorcin, which are after being dried and pulverized in the shape of their salts with alkali metals dark powders soluble in water with a bluish coloration, and being soluble in concentrated sulfuric acid generally with a greenish coloration, dyeing cotton pure greenish-blue which is rendered fast to washing by an aftertreatment with formic aldehyde; being broken up by treatment with stannous chlorid and hydrochloric acid into a 1.4-naphthalenediamin sulfonic acid, an aminooxynaphthalene and 1.3-dioxy-4-aminobenzene, substantially as described.

2. The new trisazodye being derived from 1.4-diaminonaphthalene-6-sulfonic acid, 1-aminonaphthalene-6-sulfonic acid, beta-naphthol and resorcin, which is after being dried and pulverized in the shape of its sodium salt a dark powder soluble in water with a greenish-blue coloration and being soluble in concentrated sulfuric acid with a greyish-green coloration; having in a free state most probably the following general formula:

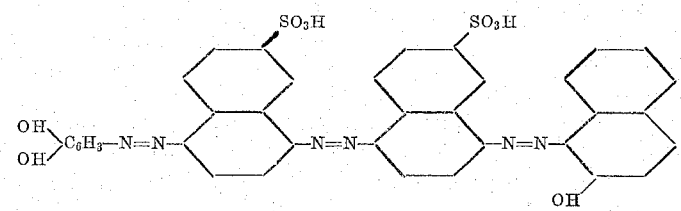

being broken up by treatment with stannous chlorid and hydrochloric acid into 1.4-diaminonaphthalene sulfonic acid, 1-amino-2-naphthol and 1.3-dioxy-4-aminobenzene: dyeing cotton pure greenish-blue shades which are rendered fast to washing by an aftertreatment with formic aldehyde, substantially as described.

In testimony whereof I have hereunto set my hand in the presence of two subscribing witnesses.

HEINRICH JORDAN.

Witnesses:
ALBERT NUFER,
FRANCES NUFER.